(12) United States Patent
Liu

(10) Patent No.: US 6,871,390 B1
(45) Date of Patent: Mar. 29, 2005

(54) SPRING DETACHMENT DEVICE FOR AUTOMOBILE

(76) Inventor: Tony Liu, No. 1, Alley 16, Lane 40, Jinn Te Rd., Taichung (TW)

( * ) Notice: Subject to any disclaimer, the term of this patent is extended or adjusted under 35 U.S.C. 154(b) by 0 days.

(21) Appl. No.: 10/666,993

(22) Filed: Sep. 16, 2003

(51) Int. Cl.⁷ ................................................ B23P 19/08
(52) U.S. Cl. ...................................................... 29/217
(58) Field of Search ..................... 29/219–221, 213.1, 29/888.92, 926.5, 464, 227; 254/10.5

(56) References Cited

U.S. PATENT DOCUMENTS 3,676,913 A * 7/1972 Fagen .......................... 29/217
5,463,802 A * 11/1995 Vachoux ....................... 29/214

* cited by examiner

*Primary Examiner*—Robert C. Watson

(57) ABSTRACT

A spring detachment device includes two fixing seats, a transverse rod, and an operation mechanism. Thus, the spring detachment device can be operated by a single person only, thereby saving the manual work and the working time. In addition, the distance between the operation mechanism and the air door can be adjusted easily and conveniently, thereby facilitating the user replacing the spring.

9 Claims, 9 Drawing Sheets

SPRING DETACHMENT DEVICE FOR AUTOMOBILE

BACKGROUND OF THE INVENTION

1. Field of the Invention

The present invention relates to a spring detachment device, and more particularly to a spring detachment device for detaching the spring of one of the air doors of an automobile.

2. Description of the Related Art

A conventional spring detachment device in accordance with the prior art shown in FIG. 1 comprises two fixing seats 1, a transverse rod 2 mounted between the two fixing seats 1, an operation rod 4 mounted on the transverse rod 2, and an operation wrench 3 mounted on the operation rod 4. Thus, the conventional spring detachment device is used for detaching the spring (not shown) of one of the air doors (not shown) of an automobile.

However, the conventional spring detachment device needs to be operated by at least two persons, thereby wasting the manual work and the working time during operation. In addition, the inclined operation angle of the conventional spring detachment device is limited, so that the conventional spring detachment device cannot be operated easily and conveniently, thereby decreasing the working efficiency.

SUMMARY OF THE INVENTION

The present invention is to mitigate and/or obviate the disadvantage of the conventional spring detachment device.

The primary objective of the present invention is to provide a spring detachment device that can be operated by a single person only, thereby saving the manual work and the working time.

Another objective of the present invention is to provide a spring detachment device that can be operated conveniently, thereby enhancing the working efficiency.

A further objective of the present invention is to provide a spring detachment device, wherein the inclined angle of the threaded rod can be adjusted easily and conveniently, thereby facilitating the user operating the spring detachment device to detach the spring.

A further objective of the present invention is to provide a spring detachment device, wherein the distance between the operation mechanism and the air door can be adjusted easily and conveniently, thereby facilitating the user replacing the spring.

In accordance with the present invention, there is provided a spring detachment device, comprising two fixing seats, a transverse rod, and an operation mechanism, wherein:

each of the two fixing seats includes an base, and a threaded rod having a lower end pivotally mounted on the base and an upper end provided with a support block;

the transverse rod is mounted between the two fixing seats and has two ends each extended through the support block of a respective one of the two fixing seats; and the operation mechanism is mounted on the transverse rod and includes a movable body movably mounted on the transverse rod, a connection portion rotatably mounted in the movable body and having an upper end protruded outward from a top of the movable body, a socket rotatably mounted on the top of the movable body and having an end secured to the upper end of the connection portion for rotating the connection portion, an auxiliary member rotatably mounted in the movable body and having an upper end secured to a lower end of the connection portion so that the auxiliary member can be rotated by the connection portion, and an operation member having an upper end secured to a lower end of the auxiliary member, so that the operation member can be rotated by the auxiliary member.

Further benefits and advantages of the present invention will become apparent after a careful reading of the detailed description with appropriate reference to the accompanying drawings.

DETAILED DESCRIPTION OF THE INVENTION

Figure 1:
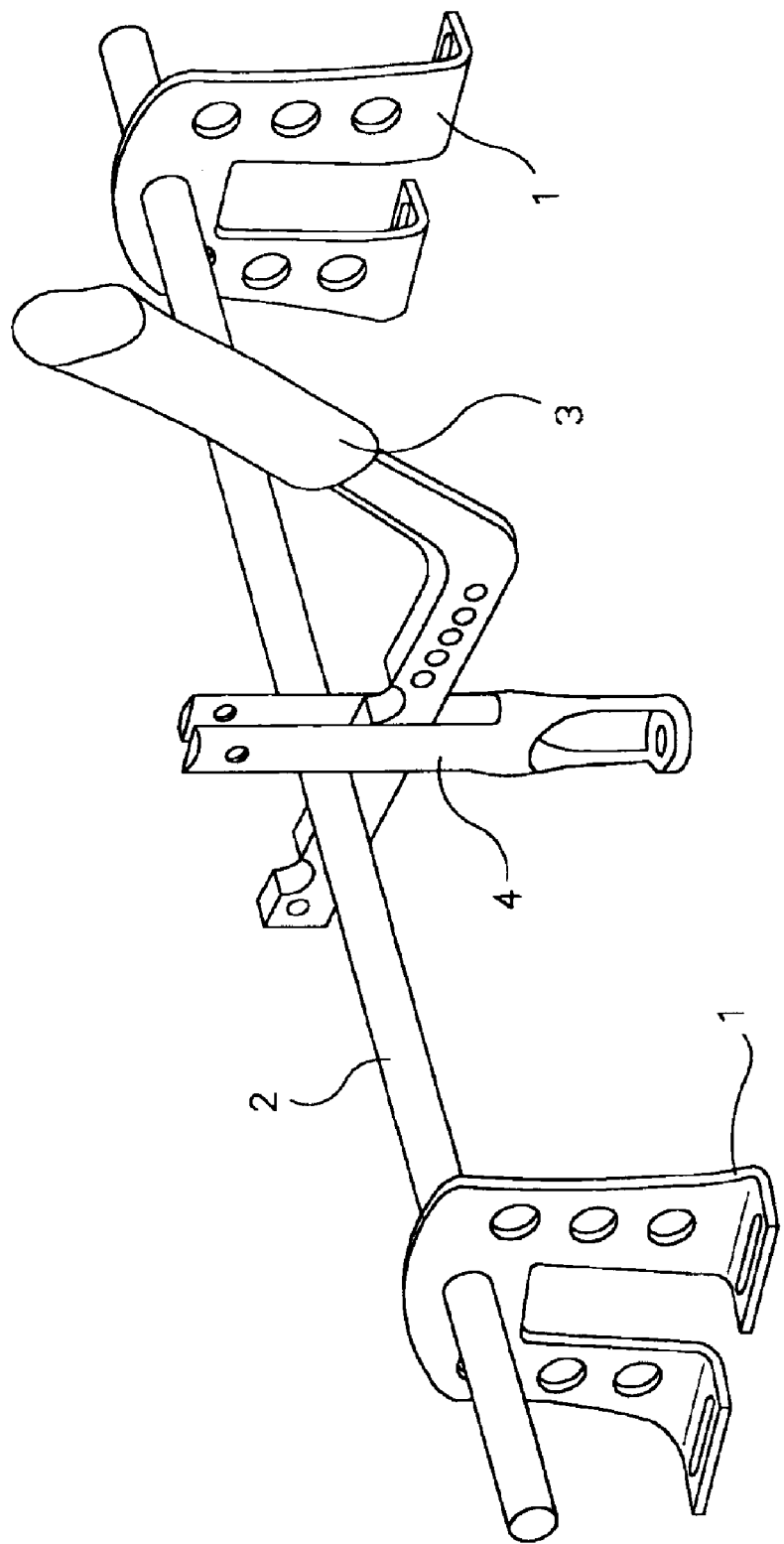
FIG. 1 is a perspective view of a conventional spring detachment device in accordance with the prior art.
Figure 2:
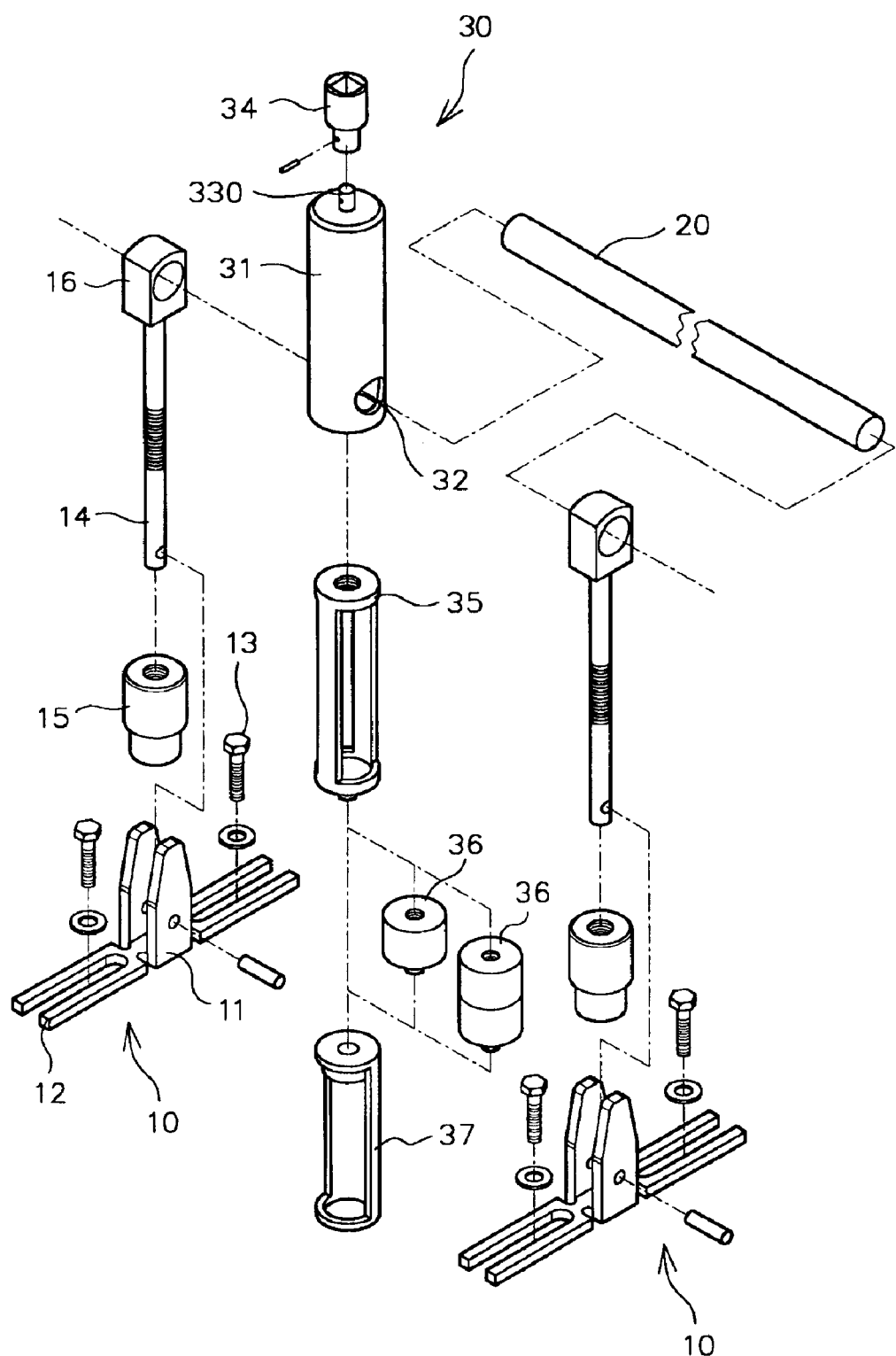
FIG. 2 is an exploded perspective view of a spring detachment device in accordance with the preferred embodiment of the present invention.
Figure 3:
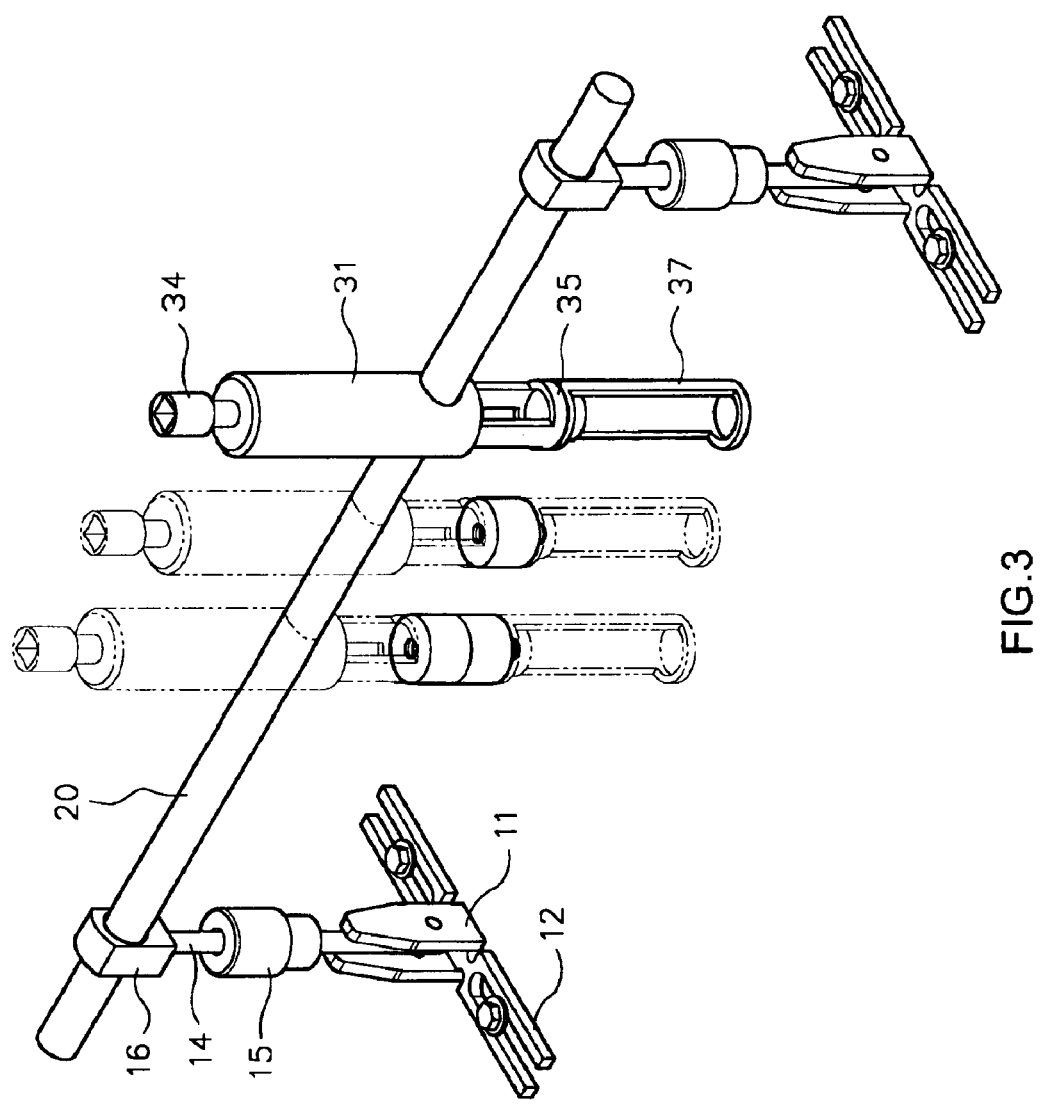
FIG. 3 is a perspective assembly view of the spring detachment device in accordance with the preferred embodiment of the present invention.

Referring to the drawings and initially to FIGS. 2–7, a spring detachment device for an automobile in accordance with the preferred embodiment of the present invention comprises two fixing seats 10, a transverse rod 20, and an operation mechanism 30.

Each of the two fixing seats 10 includes an U-shaped base 11, a support rack 12 mounted on and protruded outward from the base 11, a threaded rod 14 having a lower end pivotally mounted on the base 11 and an upper end provided with a support block 16, an adjusting block 15 movably mounted on the threaded rod 14 and rested on a top of the base 11 to adjust an inclined angle of the threaded rod 14. In addition, the support rack 12 of each of the two fixing seats 10 is fixed on an end face of the engine 40 (see FIG. 5) of the automobile by two screw members 13.

The transverse rod 20 is mounted between the two fixing seats 10 and has two ends each extended through the support block 16 of a respective one of the two fixing seats 10.

The operation mechanism 30 is mounted on the transverse rod 20 and includes a cylindrical shaped movable body 31 movably mounted on the transverse rod 20, a connection portion 33 rotatably mounted in the movable body 31 and having an upper end 330 protruded outward from a top of the movable body 31, a socket 34 rotatably mounted on the top of the movable body 31 and having an end secured to the upper end 330 of the connection portion 33 for rotating the connection portion 33, an auxiliary member 35 rotatably mounted in the movable body 31 and having an upper end secured to a lower end of the connection portion 33 so that the auxiliary member 35 can be rotated by the connection portion 33, and an operation member 37 having an upper end secured to a lower end of the auxiliary member 35, so that the operation member 37 can be rotated by the auxiliary member 35. Preferably, the movable body 31 has a lower end formed with a circular hole 32 for allowing passage of the transverse rod 20. In addition, the auxiliary member 35 has a hollow wall for allowing passage of the transverse rod 20.

The operation mechanism 30 further includes a plurality of auxiliary blocks 36 mounted between the lower end of the auxiliary member 35 and the upper end of the operation member 37 to increase the distance between the auxiliary member 35 and the operation member 37.

Figure 4:
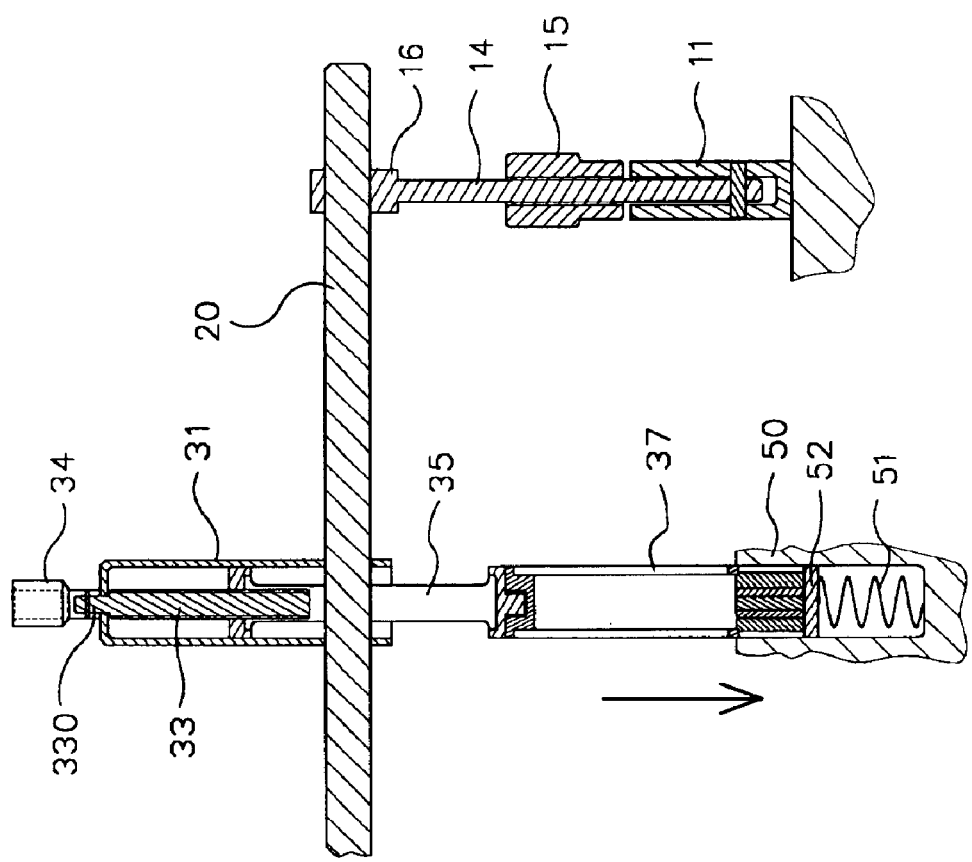
FIG. 4 is a partially cut-away plan cross-sectional view of the spring detachment device as shown in FIG. 3.
Figure 5:
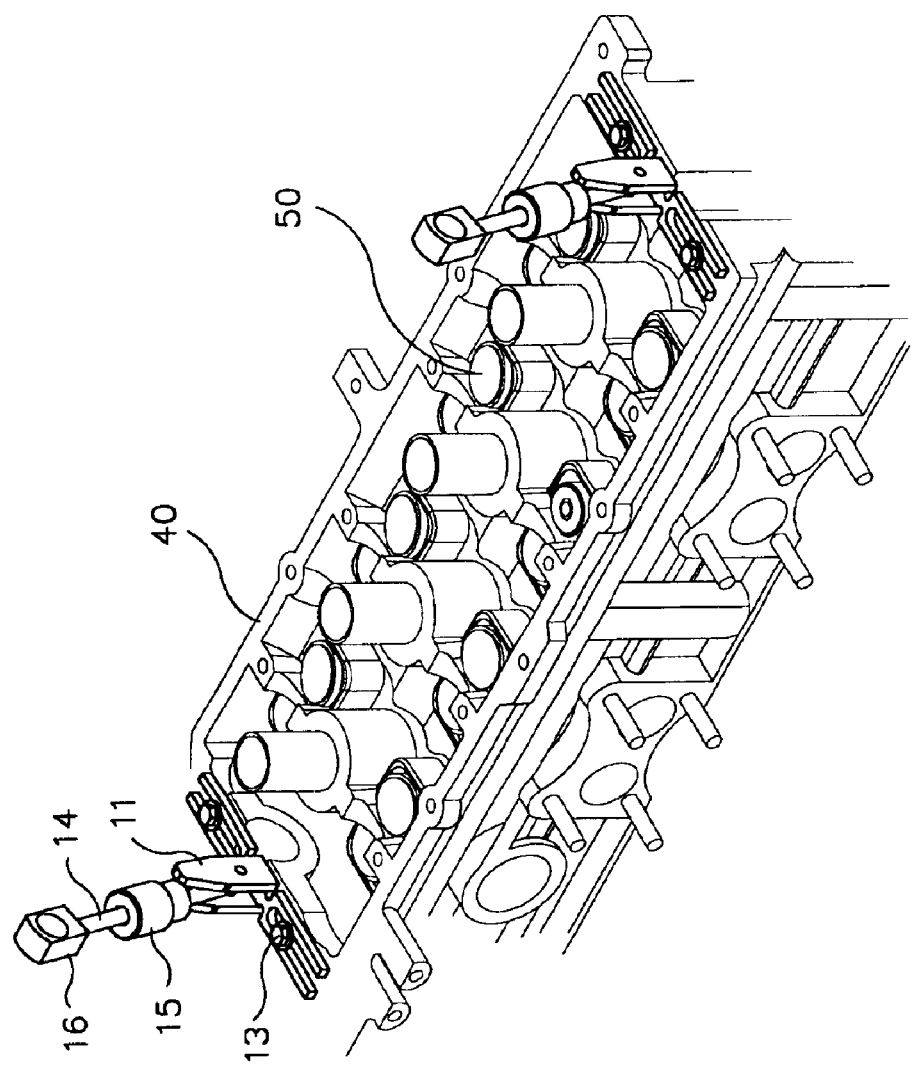
FIG. 5 is a perspective operational view of the spring detachment device in accordance with the preferred embodiment of the present invention.
Figure 6:
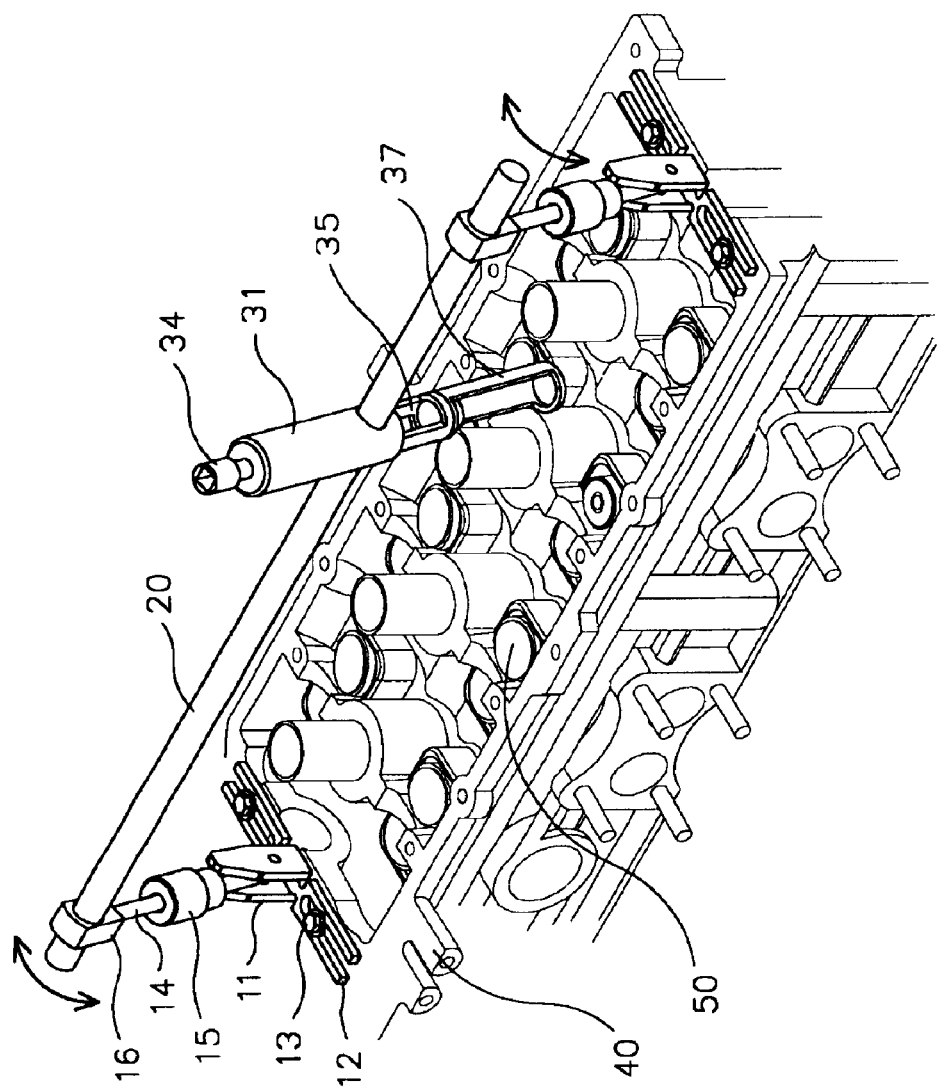
FIG. 6 is a perspective operational view of the spring detachment device in accordance with the preferred embodiment of the present invention.
Figure 7:
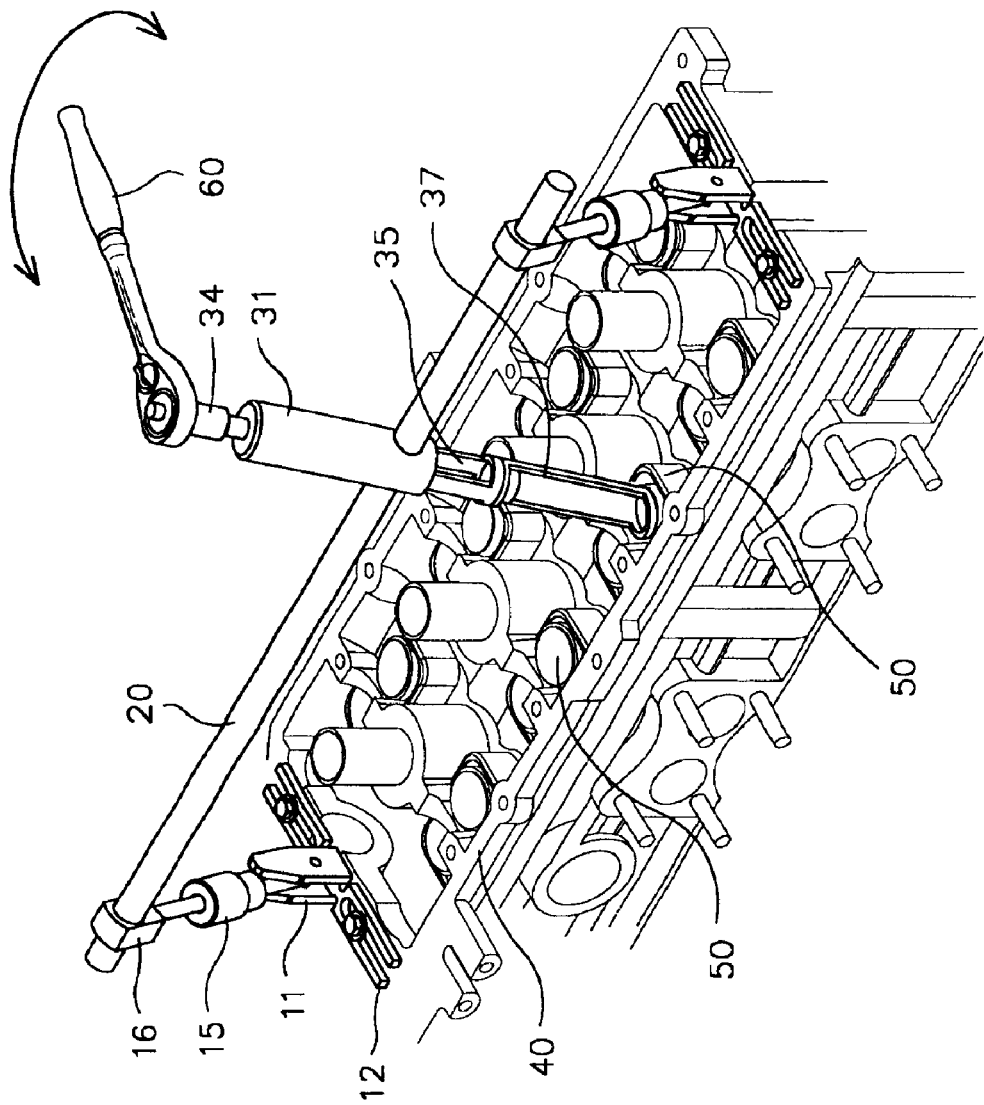
FIG. 7 is a perspective operational view of the spring detachment device in accordance with the preferred embodiment of the present invention.

In operation, the support rack 12 of each of the two fixing seats 10 is fixed on an end face of the engine 40 of the automobile by two screw members 13, so that the two fixing seats 10 are fixed on the two end faces of the engine 40 as shown in FIG. 5. Then, the transverse rod 20 is extended through the circular hole 32 of the movable body 31 and the support block 16 of each of the two fixing seats 10 as shown in FIG. 6. At this time, the adjusting block 15 is movable on the threaded rod 14 to release the base 11, so that the threaded rod 14 can be pivoted relative to the base 11 so as to adjust the inclined angle of the threaded rod 14. Then, the movable body 31 is moved on and rotated relative to the transverse rod 20 until the operation member 37 is moved to touch one of the air doors 50 of the engine 40 as shown in FIG. 7 and is rested on the air door 50 as shown in FIG. 4. Then, a hand tool, such as a ratchet wrench 60 is mounted on the socket 34 as shown in FIG. 7 to rotate the socket 34 which rotates the connection portion 33 which rotates the auxiliary member 35 which rotates the operation member 37 to detach the inner part 52 of the air door 50 from the air door 50 as shown in FIG. 4, so that the spring 51 contained in the air door 50 can be replaced.

Figure 8:
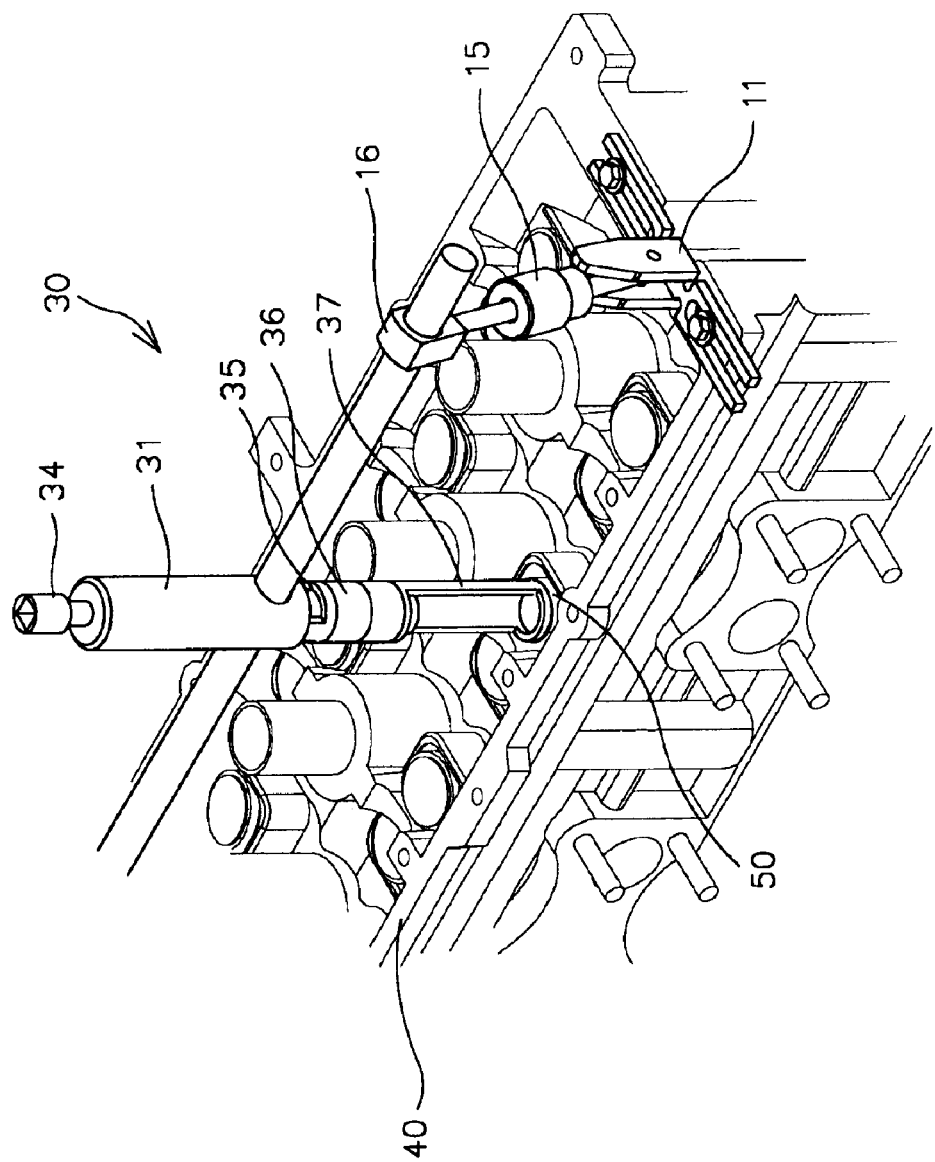
FIG. 8 is a perspective operational view of the spring detachment device in accordance with the preferred embodiment of the present invention.
Figure 9:
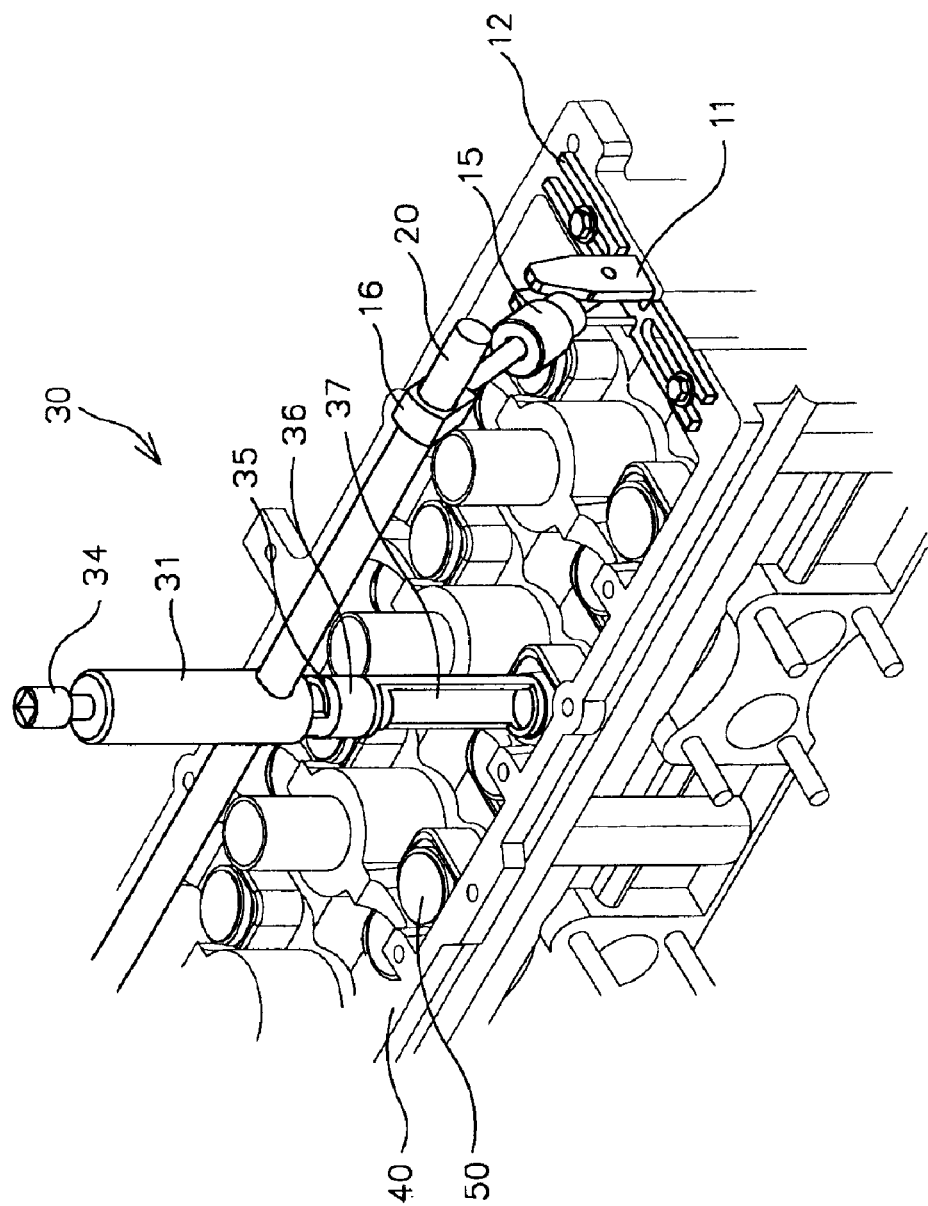
FIG. 9 is a perspective operational view of the spring detachment device in accordance with the preferred embodiment of the present invention.

Referring to FIGS. 8 and 9, the number of the auxiliary blocks 36 mounted between the lower end of the auxiliary member 35 and the upper end of the operation member 37 can be changed arbitrarily to change and adjust the distance between the auxiliary member 35 and the operation member 37, so as to adjust the distance between the operation mechanism 30 and the air door 50, thereby facilitating the user replacing the spring 51.

Accordingly, the spring detachment device can be operated by a single person only, thereby saving the manual work and the working time. In addition, the spring detachment device can be operated conveniently, thereby enhancing the working efficiency. Further, the inclined angle of the threaded rod 14 can be adjusted easily and conveniently, thereby facilitating the user operating the spring detachment device to detach the spring 52. Further, the distance between the operation mechanism 30 and the air door 50 can be adjusted easily and conveniently, thereby facilitating the user replacing the spring 51.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A spring detachment device, comprising two fixing seats, a transverse rod, and an operation mechanism, wherein:
    each of the two fixing seats includes an base, and a threaded rod having a lower end pivotally mounted on the base and an upper end provided with a support block;
    the transverse rod is mounted between the two fixing seats and has two ends each extended through the support block of a respective one of the two fixing seats; and
    the operation mechanism is mounted on the transverse rod and includes a movable body movably mounted on the transverse rod, a connection portion rotatably mounted in the movable body and having an upper end protruded outward from a top of the movable body, a socket rotatably mounted on the top of the movable body and having an end secured to the upper end of the connection portion for rotating the connection portion, an auxiliary member rotatably mounted in the movable body and having an upper end secured to a lower end of the connection portion so that the auxiliary member can be rotated by the connection portion, and an operation member having an upper end secured to a lower end of the auxiliary member, so that the operation member can be rotated by the auxiliary member.

2. The spring detachment device in accordance with claim 1, wherein the base is substantially U-shaped.

3. The spring detachment device in accordance with claim 1, wherein each of the two fixing seats further includes a support rack mounted on and protruded outward from the base.

4. The spring detachment device in accordance with claim 3, wherein the support rack of each of the two fixing seats is fixed on an end face of the engine of the automobile by two screw members.

5. The spring detachment device in accordance with claim 1, wherein each of the two fixing seats further includes an adjusting block movably mounted on the threaded rod and rested on a top of the base to adjust an inclined angle of the threaded rod.

6. The spring detachment device in accordance with claim 1, wherein the movable body is cylindrical shaped.

7. The spring detachment device in accordance with claim 1, wherein the movable body has a lower end formed with a circular hole for allowing passage of the transverse rod.

8. The spring detachment device in accordance with claim 1, wherein the auxiliary member has a hollow wall for allowing passage of the transverse rod.

9. The spring detachment device in accordance with claim 1, wherein the operation mechanism further includes a plurality of auxiliary blocks mounted between the lower end of the auxiliary member and the upper end of the operation member to increase the distance between the auxiliary member and the operation member.

\* \* \* \* \*